Aug. 23, 1955     F. C. WALLACE     2,716,178
ASSEMBLY JIG
Filed Oct. 29, 1951

INVENTOR.
FRANK C. WALLACE
BY Marvin Moody
ATTORNEY

United States Patent Office 2,716,178
Patented Aug. 23, 1955

2,716,178

ASSEMBLY JIG

Frank Charles Wallace, North Hollywood, Calif., assignor to Collins Radio Company, Cedar Rapids, Iowa, a corporation of Iowa Application October 29, 1951, Serial No. 253,575

3 Claims. (Cl. 219—17)

This invention relates in general to a welding jig and in particular to apparatus for assembling electromechanical filters.

The co-pending application of Melvin L. Doelz, Serial Number 248,011, filed September 24, 1951, entitled Mechanical Filters discloses a band-pass filter which comprises a plurality of metallic discs that are joined by metallic rods attached to their peripheries. An input metallic rod is connected to the first disc adjacent one of the connecting rods and an output metallic rod is attached to the last disc adjacent one of the metallic connecting rods. The spacing between the discs and the axial alignment is critical and it was difficult to assemble the mechanical filters prior to my present invention.

It is an object of this invention, therefore, to provide a jig for holding the electromechanical filter in its assembled position so that it may be connected together by spot welding or other means.

Another object of this invention is to provide a jig for assembling an electromechanical filter in such a manner that it will be correctly aligned.

A feature of this invention is found in the provision of a V block in which the filter discs of a mechanical filter are placed and clamped prior to being pivoted over to a welding head which attaches the connecting rods to the edges of the discs.

Figure 1:
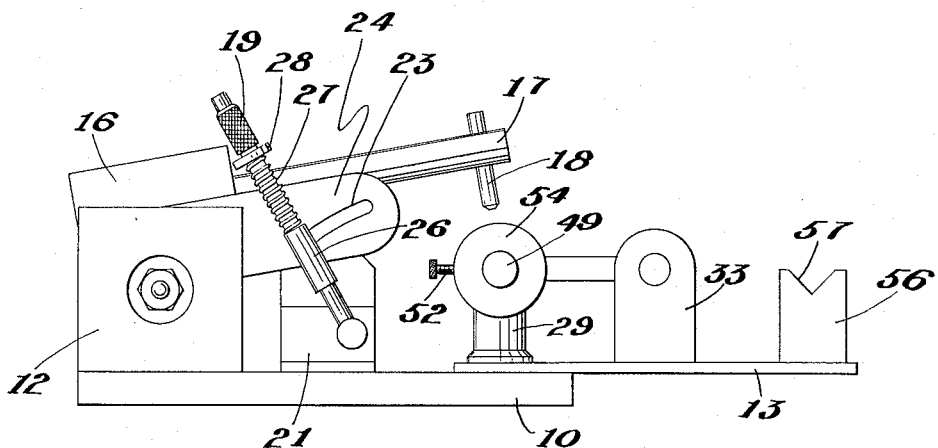
Figure 2:
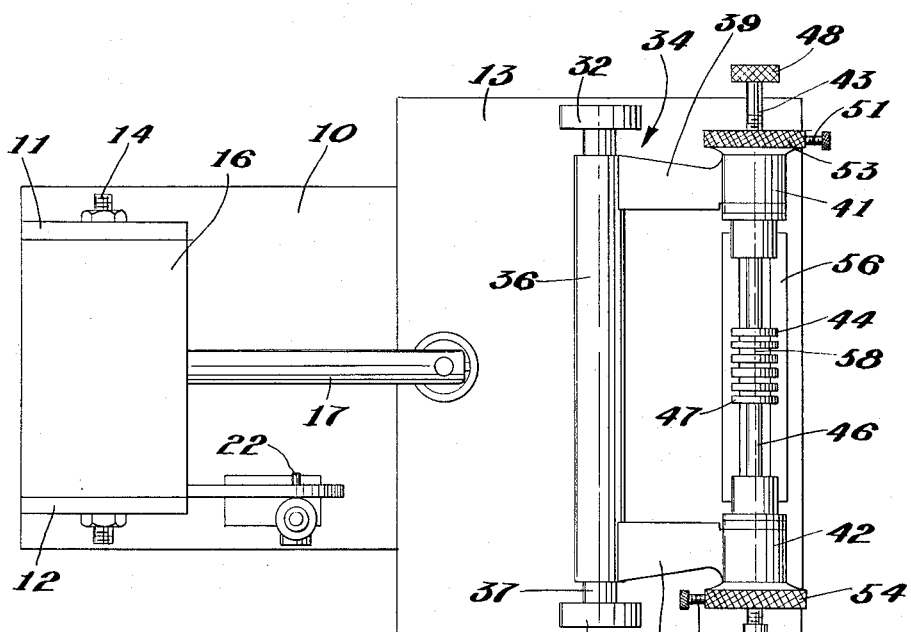

Further objects, features, and advantages of this invention will become apparent from the following descriptions and claims when read in view of the drawings, in which:

Figure 1 is a side view of the jig of this invention;
Figure 2 is a top view of the jig; and,
Figure 3 is a detail view of the workholding device.

Figure 1 illustrates the assembly jig of this invention which comprises a base member 10 that is formed with a pair of upwardly extending brackets 11 and 12, as shown in Figure 2, and a plate 13 which extends outwardly from one end.

Pivotally supported between the brackets 11 and 12 by shaft 14 is a welding head 16 which has an outwardly extending arm 17 that carries a downwardly extending electrode 18. Positioning lever 19 is pivotally supported on a portion 21 attached to the base plate 10. A pin 22 is attached to lever 19 and is received in a slot 23, formed in a projection 24 of the welding head 16. The pin 22 is attached to a sleeve 26 which is slidably mounted on the sleeve 19. A spring 27 is mounted between the top of the sleeve 26 and a washer 28.

Figure 3:
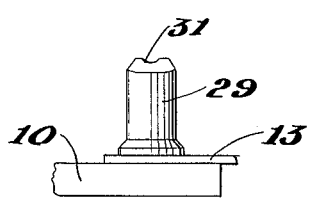

A supporting member 29 is attached to the extending portion of plate 13 beneath the electrode 18 and as shown in Figure 3, has a V shaped top portion 31 for receiving a workpiece.

A pair of upwardly extending brackets 32 and 33 are mounted on the extending portion of plate 13 and pivotally support a workholding member 34. The workholding member 34 as best shown in Figure 2, has a sleeve 36 which is pivotally supported on a shaft 37 in a manner such that the workholding member may be moved axially as well as rotated relative to shaft 37. A pair of projections 38 and 39 are mounted to the sleeve 36 and support at their ends work-engaging portions 41 and 42 respectively.

A shaft 43 is threadedly received by the member 41 and one end engages a disc 44 of the electromechanical filter being assembled. A shaft 46 is threadedly received in the member 42 and its inner end engages a disc 47 at the opposite end of the electromechanical filter. Knurled heads 48 and 49 are connected respectively to the outer ends of shafts 43 and 46 to adjust them relative to the members 41 and 42. Set screws 51 and 52 are received in knurled portions 53 and 54 respectively, and when tightened engage the shafts 43 and 46 preventing them from turning. The knurled portions 53 and 54 rotate relative to the portions 41 and 42 and are used for turning the workpiece.

In operation, the member 34 is moved to the position shown in Figure 2 and the set screws 51 and 52 are loosened so that shafts 43 and 46 may be moved. A V block 56 is placed below the shafts 43 and 46 when in the position shown in Figure 2 and the filter discs shown are placed in the V block 56 with plastic washers 58 between each disc. The washers 58 have accurately dimensioned thicknesses and are used to hold the discs a predetermined distance apart. It is to be understood, of course, that there is a plastic disc between each pair of the metal discs.

The thumb screws 48 and 49 are tightened until the workpiece is firmly clamped between the ends of the shafts 43 and 46. It is to be noted that the V 57 formed in the V block 56 aligns the discs, and the plastic washers 58 provide accurate spacing between each disc.

The set screws 51 and 52 are then tightened to prevent the shafts 41 and 43 from moving and the workholding assembly 34 is pivoted over to position shown in Figure 1. The lever 19 must be in its rearward position as shown in Figure 1 so that rod 18 will be moved to its up-position to allow the workpiece to engage the supporting member 29.

The discs will be held by the member 29 below the welding head and thin metal rods may be connected to the peripheries of the discs by moving the electrode 18 down to engage the metallic rods to form a spot weld. The welder may be of a conventional type which has one lead connected to the base plate 10 and the other lead connected to the electrode 18. Such welding machines are well known to those skilled in the art and will not be described in detail herein.

It is to be noted that the sleeve 36 may be moved relative to the shaft 37 and thus, each disc may be welded to the metal rod. After the first rod has been welded to the discs the workpiece may be rotated by the knurled portions 53 and 54 and a second rod attached in a similar manner. Generally three rods are attached equidistantly about the peripheries of the discs, but it is to be understood, of course, that any desired number may be attached. The spacing between rods must be great enough to allow the plastic discs 58 to be removed by a punch. For example, if two rods are attached to opposite sides of the discs, the plastic discs 58 may be removed and the rods will hold the discs in position. Remaining rods may then be attached to complete the filter assembly.

The filter assembly is removed from the jig by loosening the set screws 51 and 52 and by unscrewing the shafts 43 and 46.

It is seen that the invention provides a jig for assembling electromechanical filters such as described in the co-pending application of Melvin L. Doelz entitled "Mechanical Filters," Serial No. 248,011, filed September 24, 1951, and although it has been described in respect to this particular embodiment, it is not to be so limited as changes and modifications may be made therein which are within the full intended scope of the invention as defined by the appended claims.

I claim:

1. A jig for assembling a plurality of elements in predetermined relative positions comprising a base member, a two part securing means having one part pivotally supported on said base member and the other part constituting a support fixedly mounted on said base member and adapted to supportingly engage at least one of said elements, a workholder including an arm which supports a clamping means, said arm journaled for rotation about a transverse axis on said base member and adapted to transfer said plurality of elements, a grooved block mounted on said base member, said support, said block and said clamping means being equally spaced from said axis, said support and said block being oppositely disposed with respect to said axis, said clamping means being rotatably mounted on said arm about a second transverse axis and adapted in a first position of said arm adjacent said block to supportingly engage said plurality of elements and adapted in a second position of said arm between said two parts to present different portions of said elements to said parts.

2. A jig for assembling electromechanical filters comprising a base member, a V block mounted on said base member and adapted to position the electromechanical filter elements with respect to each other, a pair of upwardly extending brackets mounted on said base member, a workholder member rotatably and reciprocably supported by said brackets and rotatable to a first position in engagement with said V block and adapted to supportingly engage said elements, a support member on the base member constituting a first welding electrode, said support member and said block being equally spaced and oppositely disposed from the pivotal axis of said workholder member, said workholder member being rotatable to a second position adjacent said support member and being reciprocable thereat whereby it is adapted to successively position said elements in alignment with said electrode.

3. A transfer mechanism for holding plural electromechanical filter elements in alignment during a welding operation comprising a base, a pair of upright supports attached to said base, a shaft fixed between said supports, a transfer arm including a sleeve rotatably and reciprocably supported on said shaft for permitting movement from a first station to a second station and lateral positioning at said stations, first and second projections extending from said sleeve in the same transverse direction, a first portion at the end of said first projection, a second portion at the end of said second projection, a first capped sleeve rotatably mounted in said first portion, a second capped sleeve rotatably mounted in said second portion, a first clamping member threadedly received through said first capped sleeve and a second clamping member threadedly received through said second capped sleeve in axial alignment with said first clamping member for holding a workpiece in preset alignment between said clamping members, whereby said clamping members are adapted to permit rotative positioning of said elements at said stations.

References Cited in the file of this patent

UNITED STATES PATENTS

| 1,149,552 | Coleman | Aug. 10, 1915 |
| 1,445,231 | Muller | Feb. 13, 1923 |
| 1,709,716 | Fielder | Apr. 16, 1929 |
| 1,751,419 | Phelps | Mar. 18, 1930 |
| 2,034,560 | Bumstead | Mar. 17, 1936 |
| 2,229,477 | Shannon | Jan. 21, 1941 |
| 2,303,719 | Stull | Jan. 29, 1946 |
| 2,393,780 | Johansson | Jan. 29, 1946 |